United States Patent [19]

Capobianco et al.

[11] Patent Number: 4,671,638

[45] Date of Patent: Jun. 9, 1987

[54] MOVING COIL ELECTROMAGNETIC ACTUATOR AND SHUTTER EMPLOYING SAME

[75] Inventors: Richard N. Capobianco; David L. White, both of Rochester, N.Y.

[73] Assignee: Eastman Kodak Company, Rochester, N.Y.

[21] Appl. No.: 786,432

[22] Filed: Oct. 11, 1985

[51] Int. Cl.[4] .............................................. G03B 9/14
[52] U.S. Cl. .................................. 354/234.1; 354/250; 335/222
[58] Field of Search ................... 354/230, 234.1, 235.1, 354/250, 271.1; 335/205, 206, 207, 222, 223, 224, 274

[56] References Cited

U.S. PATENT DOCUMENTS

| | | | |
|---|---|---|---|
| 2,773,239 | 12/1956 | Parker | 324/150 |
| 2,974,284 | 3/1961 | Parker | 324/150 |
| 3,344,397 | 9/1967 | Elliott et al. | 340/17 |
| 3,581,298 | 5/1971 | Billawalla | 340/174.1 |
| 3,648,999 | 3/1972 | Bauer | 267/160 |
| 3,817,508 | 6/1974 | Bergstrom et al. | 267/160 |
| 4,093,954 | 6/1978 | Prewitt, Jr. et al. | 346/7 |
| 4,333,722 | 6/1982 | Lee | 354/234 |
| 4,348,092 | 9/1982 | Hirohata et al. | 354/230 |
| 4,384,778 | 5/1983 | Lee et al. | 354/230 |
| 4,400,861 | 8/1983 | Parker | 29/173 |
| 4,413,895 | 11/1983 | Lee | 354/234.1 |
| 4,415,252 | 11/1983 | Hirohata et al. | 354/234.1 |
| 4,470,687 | 9/1984 | Saito et al. | 354/234.1 |
| 4,504,132 | 3/1985 | Martin et al. | 354/234.1 |
| 4,514,064 | 4/1985 | Kurosu et al. | 354/234.1 |

*Primary Examiner*—A. A. Mathews
*Attorney, Agent, or Firm*—Donald D. Schaper

[57] ABSTRACT

In an electromagnetic actuator of the type having a planar coil armature mounted for movement in a magnetic field by a plurality of planar flexure springs, the flexure springs lie entirely in the plane of the planar armature.

15 Claims, 8 Drawing Figures

MOVING COIL ELECTROMAGNETIC ACTUATOR AND SHUTTER EMPLOYING SAME

TECHNICAL FIELD

The present invention relates to a moving coil electromagnetic actuator and more particularly to a moving coil actuator having a planar coil armature and to a camera shutter employing the actuator.

BACKGROUND ART

Planar coil electromagnetic actuators, employed for example to move a shutter blade in a photographic camera, are known. U.S Pat. No. 4,333,722 shows such a planar coil electromagnetic actuator having an armature comprising a planar coil formed for example by photofabrication techniques on a flexible plastic support material. The armature is mounted for movement in a magnetic field by electrically conductive flexure springs that provide a low friction mounting, a built-in restoring force for the actuator, and electrical connections to the planar coils in the armature. An extension of the planar armature forms a shutter blade to cover and uncover an aperture in a camera.

A shortcoming of this arrangement is that the planes of the flexure springs lie perpendicular to the plane of the armature, thereby necessitating a manufacturing step to attach the flexure springs to the planar armature, or where the flexure springs are formed as an integral part of the armature, necessitating an operation to bend the flexure springs out of the plane of the armature into a working position. A further shortcoming of this arrangement is the fact that the flexure springs in their working position are much thicker than the planar armature, thereby placing limits on the overall thickness of the actuator and the allowable locations of the flexure springs.

It is an object of the present invention to provide an electromagnetic actuator of the type having a planar coil armature mounted for movement in a magnetic field by conductive flexure springs that is free from the shortcomings noted above.

DISCLOSURE OF THE INVENTION

The object of the invention is achieved by mounting the planar coil armature with a plurality of planar conductive flexure springs lying entirely in the plane of the armature coil.

In a preferred mode of practicing the invention, the planar conductive flexure springs form concentric spirals, with the center of the spiral being fixed and external electrical connections to the planar coil being provided at the center of the spiral. The planar coil armature comprises a coil pattern of springy conductive material carried by a sheet of springy plastic, and the planar conductive flexure springs are comprised from the same sheet of conductive material.

The planar armature mounted by planar flexure springs lying entirely in the plane of the armature is employed in a shutter of the type where an extension of the planar armature forms a light-blocking member. In a preferred embodiment, the shutter comprises a pair of such planar armatures wherein the planar flexure springs define concentric spiral patterns with the center of the spirals fixed with respect to a mechanism plate. A pair of such armatures are mounted for opposing movement in a magnetic field to cover and uncover an aperture in the mechanism plate.

MODES OF CARRYING OUT THE INVENTION

Figure 1:
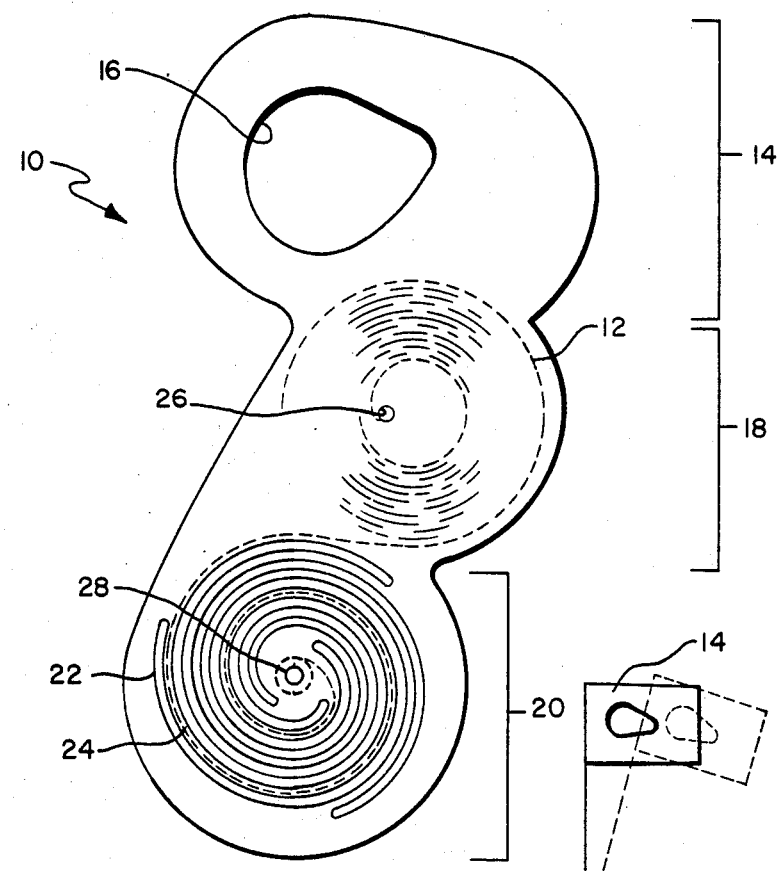
FIG. 1 is a plan view of a planar coil armature according to the present invention.

FIG. 1 is a plan view of a planar coil armature, generally designated 10, for an electromagnetic actuator. The armature 10 comprises a flexible planar support, formed for example from a sheet of plastic, and a flexible conductor formed for example by patterning a thin layer of copper on the sheet using photolithography techniques, and plating the copper to a thickness sufficient for providing desired mechanical qualities such as springyness and stiffness and electrical conductivity. The conductive pattern is formed on both sides of the plastic sheet. The flexible conductor is patterned to define a planar coil 12 and other structural and electrically conductive features. One portion of the planar support, designated 14, defines a shutter blade, having an aperture 16 for covering and uncovering an aperture in a mechanism plate (not shown in FIG. 1). A second portion of the planar support designated 18 provides a region for supporting the planar coil 12. A third portion of the planar support designated 20 is perforated with a plurality of concentric spiral grooves 22 to define a plurality of planar concentric spiral springs 24.

The flexible conductor serves the dual functions of conducting electricity to the coil, and providing increased stiffness to the planar support. Unconnected patterns of the conductor are provided in areas of the armature requiring increased stiffness, such as the region around the outside of the spiral springs, and the region around the aperture 16. The spiral springs 24 are covered with the conductor material both top and bottom to add stiffness to the springs and to provide electrical contact to the planar coils 12 on the top and bottom of the flexible support. A plated through hole 26 connects the top coil to the bottom coil, and a partially plated through hole 28 provides an electrical connection to the coils as described below.

Figure 2:
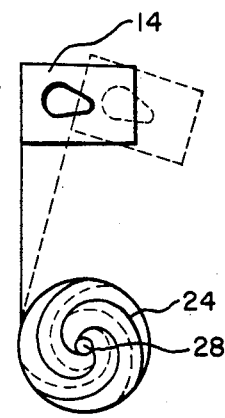
FIG. 2 is a schematic diagram illustrating the operation of the planar coil armature shown in FIG. 1.

The armature 10 is adapted to be secured to a mechanism plate and electrical connection made at the partially plated through hole 28. The inventor has discovered through experiment and computer modeling that the coil springs 24 can be designed to have a sufficient stiffness to adequately support the armature, and not buckle out of the plane of the armature when the armature is rotated about the fixed through hole 28. FIG. 2 illustrates the flexure action of the coil springs 24 when the armature is rotated about fixed point 28 to displace the shutter blade 14.

An electromechanical shutter mechanism employing a pair of the armatures shown in FIG. 1, will now be described with reference to FIG. 3. The armatures designated 10 and 10', are mounted on a molded plastic mechanism plate 30 on posts 32 and 32' respectively. The posts are inserted through the respective partially plated through holes 28 and 28' in the armatures 10 and 10', and an electrical connector 34 having partially plated through holes 36 and 36' is placed over the posts on top of the armature to provide electrical connection to the armature as described below.

The armatures 10 and 10' and the electrical connector 34 are secured to the mechanism plate by forming heads on the posts by known ultrasonic riveting techniques. A magnet 38 having one half 38a magnetized North to South, and the other half 38b magnetized South to North, is received in a nest 40 in the back side of mechanism plate 30 such that the top surface of the magnet is flush with the top surface of the mechanism plate 30. A flux plate 42 is placed on the back side of the magnet 38 to complete a magnetic circuit between the two halves of the magnet. When the actuator is assembled, the coils 12 and 12' of the armatures 10 and 10' lie in substantially overlapping relation, and the dividing line between the two halves of the magnet 38 is centered between the two coils.

A flux plate 44 having an aperture 46 is received in notches 48 on the top of the mechanism plate and is held in spaced relation from the top surface of magnet 38 by magnetic force. The aperture 46 in the flux plate 44 is aligned with an aperture 50 in the mechanism plate, which the apertures 16 and 16' of the armatures 10 and 10' cover and uncover when the shutter is operated.

Figure 4:
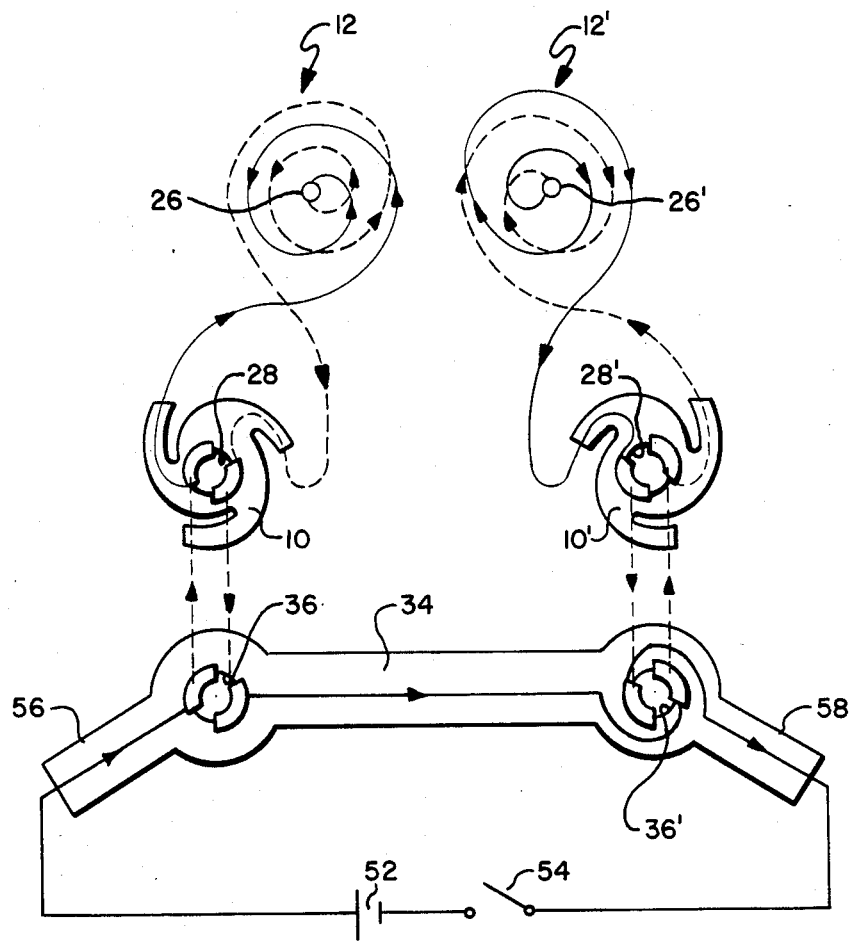
FIG. 4 is a schematic diagram illustrating current flow through the planar coil armature shown in FIG. 3.

The electrical connection of the armatures with an external power circuit will now be described with reference to FIG. 4. An external power circuit, shown for example as a battery 52 and a switch 54 is connected to the armatures through conductive tabs 56 and 58 on the connector 34. The connector 34 may be made from the same material using the same processes of manufacture as the armatures 10 and 10'. In Fig. 4, only the portions of armatures 10 and 10' around the through holes 28 and 28' are shown. The through holes 28 and 28' are not fully plated around their circumference, rather two plated through connections are provided around each through hole. One side of the through hole connects to the coil on the same side of the armature and the other side of the through hole connects to the coil on the opposite side of the armature so that electrical contact can be made to the coils on both sides from either side of the armature.

Similarly, the contacts around through holes 36 and 36' in the connector 34 are formed in two parts so that separate connection can be made to the top and bottom coils on each armature.

When the shutter is assembled, and switch 54 is closed, current flows through the armature coils as indicated by the arrows in FIG. 4. The current flows into the conductor on tab 56, counterclockwise through the top coils on armature 10, then through the bottom coil, shown in phantom, in armature 10. The bottom coil in armature 10 is connected via connector 34 to the bottom coil in armature 10', where the current flows in a clockwise direction. Current then flows through the top coil in armature 10' in a clockwise direction and finally returns to the battery through tab 58 of connector 34.

The coils on armatures 10 and 10' are shown separated from each other for clarity in FIG. 4. In operation, the coils are substantially overlapping, each coil being immersed approximately one half in each magnetized field direction produced by magnet 38. The current in the coils in the magnetic field causes armature 10 to be urged to the right as seen in FIG. 4, and armature 10' to be urged to the left, thereby actuating the shutter.

Figure 3:
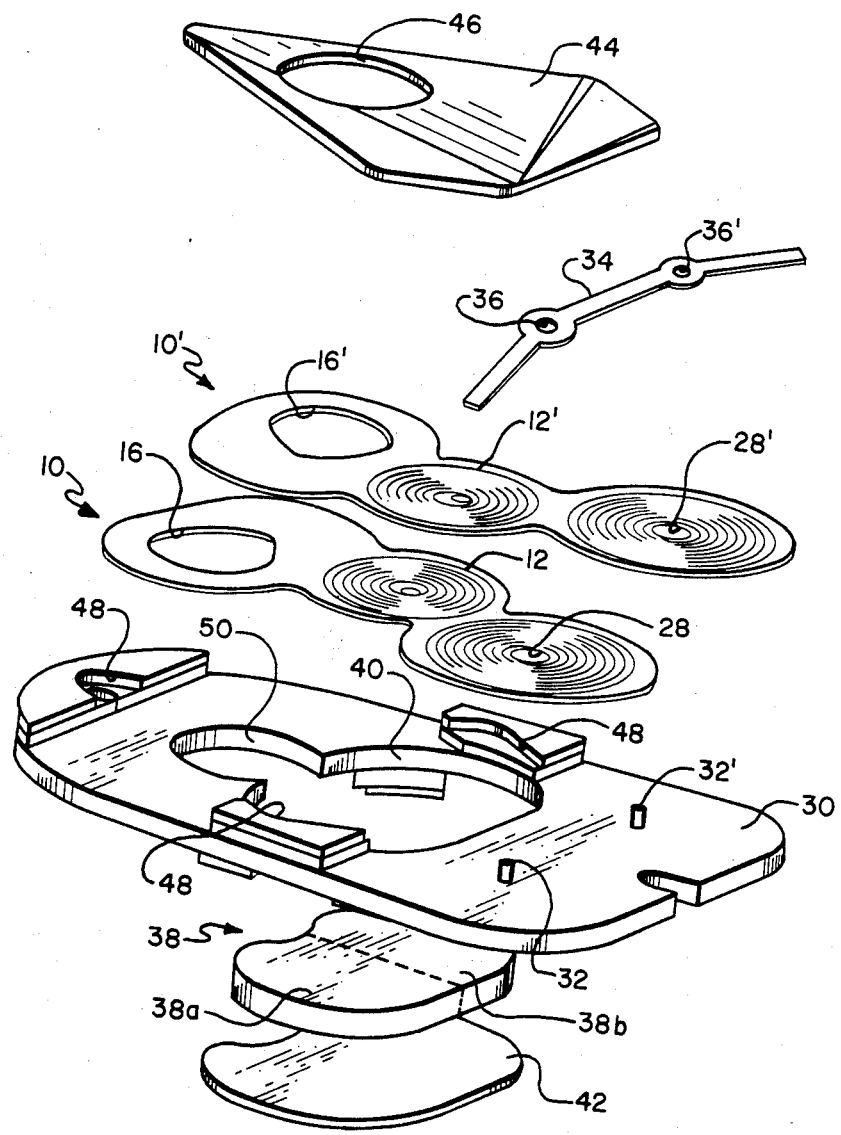
FIG. 3 is an exploded perspective view of a shutter mechanism according to the present invention.

A shutter mechanism as shown in FIG. 3 was constructed and operated. The armatures 10 and 10' were constructed as follows.

Copper foil 0.01 cm thick was laminated to both sides of a sheet of 0.01 cm thick polyethylene terephthalate film. The copper was coated with photoresist, exposed in the electrode patterns and etched to yield the electrode patterns covered by insulating photoresist. The armatures were than die cut from the plastic film. The photoresist was removed in areas where electrical contact was made to the conductor. The armatures were 5.3 cm long by about 2.2 cm wide. The three spiral flexures were each two turns in length (720°), and 0.05 cm wide.

Figure 5:
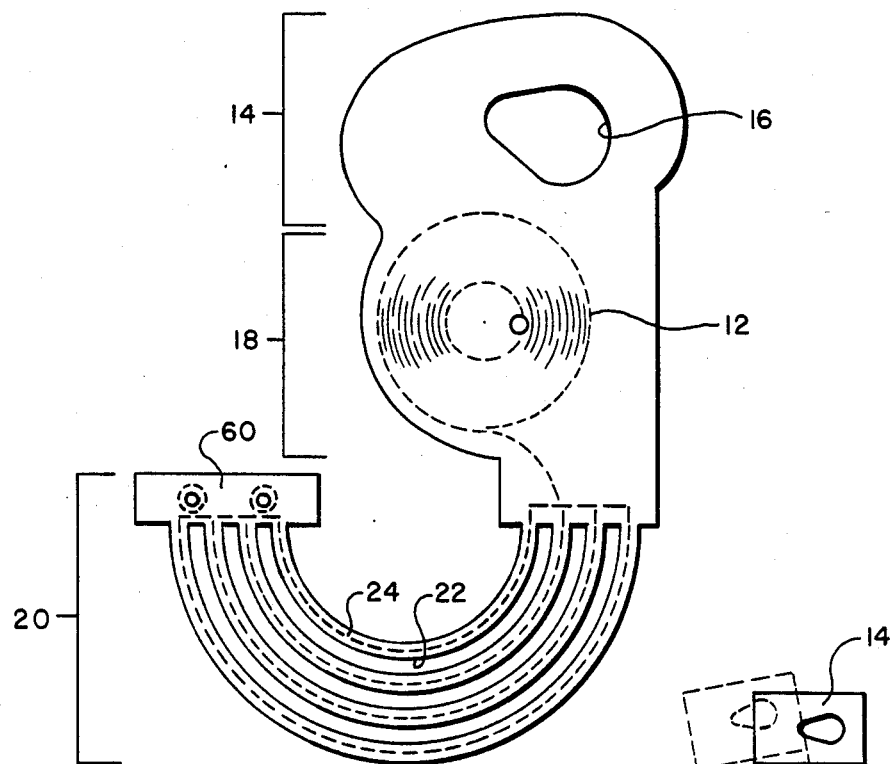
FIG. 5 is a plan view of a first alternative embodiment of a planar coil armature according to the present invention.
Figure 6:
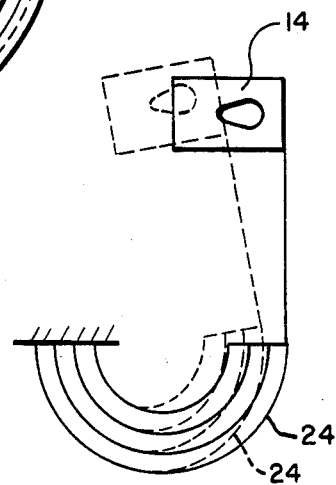
FIG. 6 is a schematic diagram illustrating the operation of the planar coil armature shown in FIG. 5.

An alternative arrangement of planar flexures lying entirely in the plane of the armature according to the present invention is shown in FIG. 5, where elements similar to elements shown in FIG. 1 are similarly numbered. The flexure springs define semicircles that connect a fixed mounting pad 60 to the moveable coil and shutter blade portion of the armature. FIG. 6 illustrates how the planar flexures 24 deform as the shutter blade 14 is moved by the armature.

Figure 7:
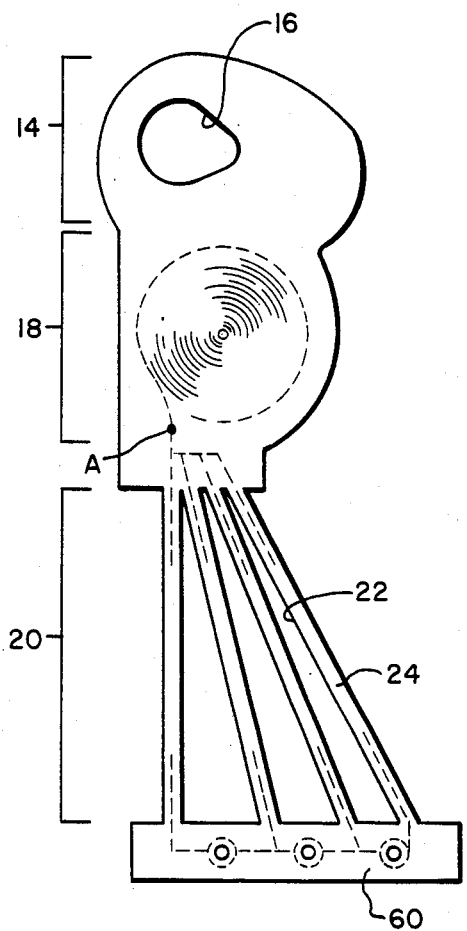
FIG. 7 is a plan view of a second alternative embodiment of a planar coil armature according to the present invention.
Figure 8:
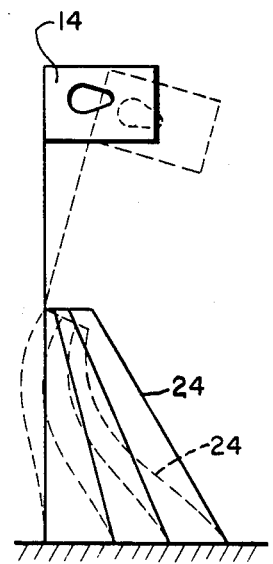
FIG. 8 is a schematic diagram illustrating the operation of the planar coil armature shown in FIG. 7.

FIG. 7 shows a further alternative mode of practicing the present invention, wherein the planar flexure springs 24 are arranged to converge onto a virtual pivot point A. The armature is mounted and electrical connection is made through a mounting strip 60. FIG. 8 illustrates how the planar flexures 24 are deformed as the shutter blade 14 is moved by the armature.

INDUSTRIAL APPLICABILITY AND ADAVANTAGES

The present invention is useful in small appliances and apparatus having electromagnetic actuators for generating reciprocal motion. The invention is advantageous in that the thickness dimensions of the apparatus can be reduced due to the flexure springs lying in the plane of the armature. The invention has the further advantage that the armature is more easily manufactured, and the total parts count of apparatus employing such an armature is reduced, thereby reducing the cost of manufacture of the apparatus.

We claim:

1. An electromagnetic actuator of the type having a planar coil armature mounted for movement in a magnetic field by a plurality of planar conductive flexure springs, characterized by:
   the planes of the conductive flexure springs lying entirely in the plane of the armature coil.

2. The electromagnetic actuator claimed in claim 1, wherein the conductive flexure springs define a spiral pattern, the center of the spiral being fixed and external electrical connections to the armature being provided at the center of the spiral pattern.

3. The electromagnetic actuation claimed in claim 2, wherein the planar coil armature comprises a sheet of insulating support material having a conductive pattern on both sides of said sheet, and including a plated through hole connecting the center of the coil on one side of the sheet to the center of the coil on the other side, and a partially plated through hole at the center of the spiral pattern for making electrical contact to the coils.

4. The electromagnetic actuator claimed in claim 1, wherein the planar coil armature comprises a coil pattern of springy conductive material carried by a sheet of springy plastic, and wherein the conductive flexure springs are similarly comprised from the same plastic sheet and conductive material.

5. A shutter of the type having a planar blade emmber including a portion for blocking light and a portion for carrying a planar conductive coil, the blade member being mounted for movement in a magnetic field by planar conductive flexure springs, characterized by:
the planes of the conductive flexure springs lying entirely in the plane of the planar blade member.

6. The shutter claimed in claim 5, wherein the flexure springs define a spiral pattern, the center of the spiral being fixed.

7. The shutter claimed in claim 6, wherein the planar blade member conprises a sheet of insulating support material having a conductive pattern on both sides of said sheet, and including a plated through hole connecting the center of the coil on one side of the sheet with the center of the coil on the other side, and a partially plated through hole at the center of the spiral pattern for making electrical contact to the coils.

8. The shutter claimed in claim 6, wherein the planar blade member comprises a sheet of opaque plastic material, said planar conductive coil being formed on said sheet of plastic, and said flexure springs being comprised from the same sheet of material.

9. The shutter claimed in claim 7, further characterized by having a pair of armatures mounted for opposing motion in a magnetic field for covering and uncovering an aperture, and having a conductor member for conducting the armatures in series.

10. An electromagnetic acutator, comprising:
a magnet and a flux plate for defining a magnetic gap;
an armature having a planar coil positioned in the magnetic gap;
a plurality of planar flexure springs connected to said armature of mounting the armature for movement in the magnetic gap, said planar flexure springs lying entirely in the plane of said armature.

11. The electromagnetic actuator claimed in claim 10, wherein said flexure springs are electrically conductive for conducting current to said planar coil.

12. The electromagnetic actuator claimed in claim 11, wherein said conductive flexure springs define a spiral pattern, the center of the spiral being fixed, and external electrical connections to the planar coil being provided at the center of the spiral pattern.

13. A shutter, comprising:
a planar blade including a portion for blocking light, and a portion bearing a planar coil for imparting movement to the blade,
means for defining a magnetic gap, the planar coil being positioned in said magnetic gap and responsive to a current in said coil to move said blade.
a plurality of planar flexure springs for mounting said planar blade for movement in said magenetic gap, said planar flexure springs lying entirely in the plane of the planar blade.

14. The shutter claimed in claim 13, wherein said flexure springs are electrically conductive for conducting current to said planar coil.

15. The shutter claimed in claim 14, wherein said flexure springs define a spiral pattern, the center of the spiral being fixed, and external electrical connections to the planar coil being provided at said center.

* * * * *